United States Patent
Mendonca

Patent Number: 6,105,808
Date of Patent: Aug. 22, 2000

[54] OPENING AND CLOSING SAFETY DEVICE FOR A PRESSURE COOKER

[75] Inventor: Fernando Jorge Mendonca, Carregosa, Portugal

[73] Assignee: Cruzinox Industria Metalurgica, LDA, Portugal

[21] Appl. No.: 09/187,266

[22] Filed: Nov. 6, 1998

[30] Foreign Application Priority Data

Nov. 7, 1997 [PT] Portugal .............................. PT 102.076

[51] Int. Cl.$^7$ .................................................. B65D 45/00
[52] U.S. Cl. .......................... 220/316; 220/318; 220/756; 220/DIG. 17; 220/DIG. 20
[58] Field of Search .............................. 220/201, 203.19, 220/203.22, 293, 295, 296, 297, 298, 299, 300, 301, 316, 318, 721, 722, 756, 912, DIG. 17, DIG. 20

[56] References Cited

U.S. PATENT DOCUMENTS

| | | |
|---|---|---|
| 2,584,759 | 2/1952 | Swenson .............................. 220/316 X |
| 2,636,635 | 4/1953 | During, Sr. et al. . |
| 3,973,694 | 8/1976 | Tess ..................................... 220/316 X |
| 4,251,007 | 2/1981 | Behnisch ................................. 220/316 |
| 4,257,394 | 3/1981 | Zabel .................................. 220/316 X |
| 4,423,825 | 1/1984 | Baumgarten ............................ 220/316 |
| 4,620,643 | 11/1986 | Sebillotte ................................ 220/316 |
| 5,135,121 | 8/1992 | Javier .................................. 220/316 X |

FOREIGN PATENT DOCUMENTS

| | | |
|---|---|---|
| 0 614 639 A1 | 3/1994 | European Pat. Off. . |
| 0 736 282 A1 | 3/1996 | European Pat. Off. . |
| 1067772 | 1/1954 | France . |
| WO85/03851 | of 1985 | WIPO . |

*Primary Examiner*—Stephen K. Cronin
*Attorney, Agent, or Firm*—Locke Reynolds LLP

[57] ABSTRACT

Opening/closing safety device to be mounted on a bayonet pan, consisting of a body (1) to which a side handle is attached (11), and a lid (2) to which an upper body is attached (3), which consists of a lever (4) which, when it is in its initial position, guarantees that there is no pressure inside the pan and which, when it is locked (pressure cooker), prevents the pan from opening.

3 Claims, 3 Drawing Sheets

OPENING AND CLOSING SAFETY DEVICE FOR A PRESSURE COOKER

BACKGROUND OF THE INVENTION

This invention relates to an opening and closing safety device for a pressure cooker.

SUMMARY OF THE INVENTION

The invention consists of a device to be mounted on a pressure cooker having a bayonet-type latching system and it has two different functions. Firstly, it guarantees that there is no pressure inside the pan when it is not correctly closed (safety closing) and secondly it guarantees that the user can only open the pan when there is no pressure inside it (safety opening).

DETAILED DESCRIPTION OF THE PREFERRED EMBODIMENT

Figure 1:
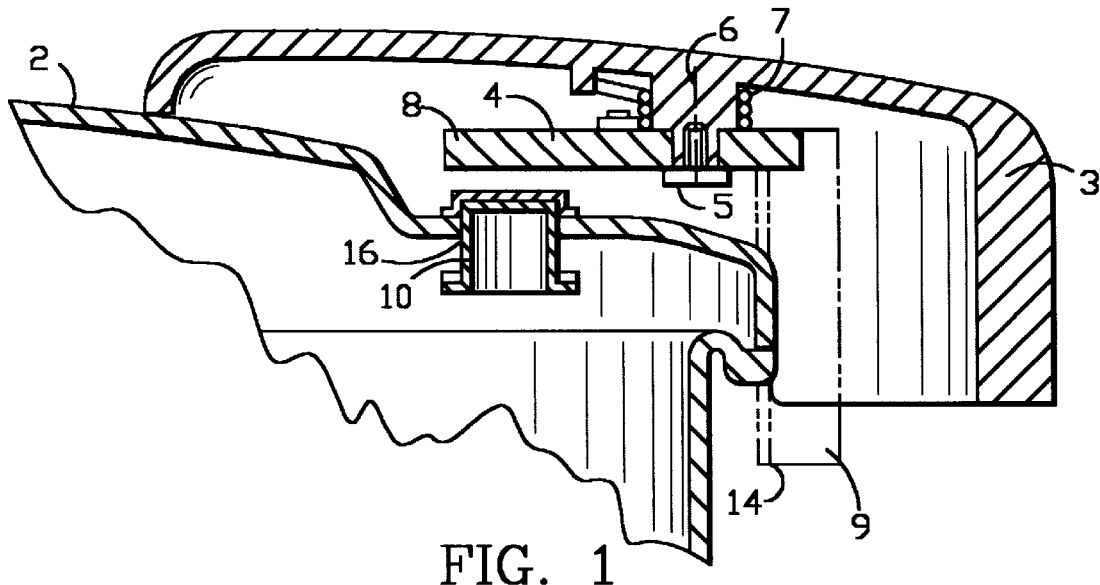
FIG. 1 is a side cross-sectional view of the safety device in the initial position.
Figure 2:
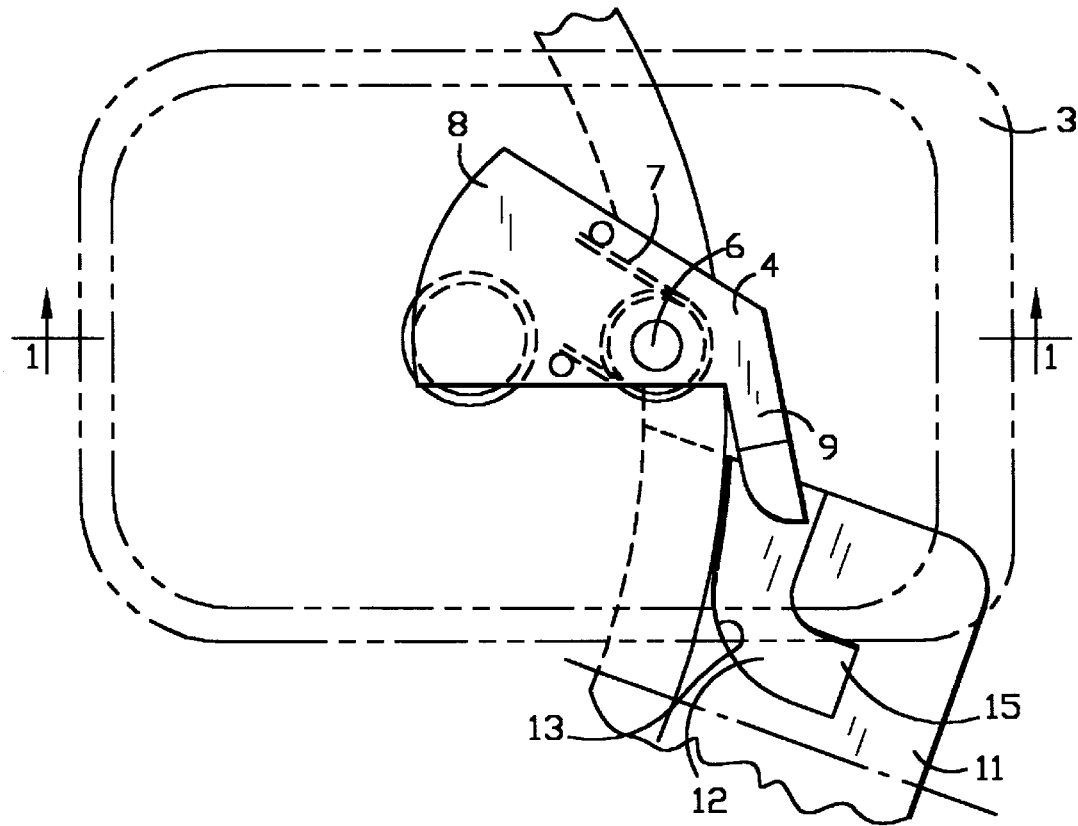
FIG. 2 is a top cross-sectional view of FIG. 1 of the safety device in the initial position.

The aforementioned device is intended to be mounted on a pressure cooker consisting of a cooker body (1) and a lid (2), which are mounted by means of a bayonet latch securing system. The safety device is mounted on the lid (2) and consists of an upper body member (3) to which a lever is attached (4), held in place by a screw (5). The lever turns on its central axis (6) and is kept in a rest position by means of a spring (7) which compresses it (this axis is parallel to the generator of the cylinder of the body).

The lever (4) has a wide surface (8) at one end perpendicular to the central axis in the shape of a section of a circumference, and at the other end it has a foot (9) parallel to the axis with a rounded cross-section. A pop-up valve (10) is also mounted on the lid which goes up whenever there is any pressure, thus remaining in a closed position (guaranteeing that the pan is sealed).

On the cooker body there is a side handle (11) which allows the pan to be handled and which has a cavity or L-shaped channel (12), where there is a rounded elbow (13) which allows the foot (9) of the lever to slide when the pan is closed.

Figure 3:
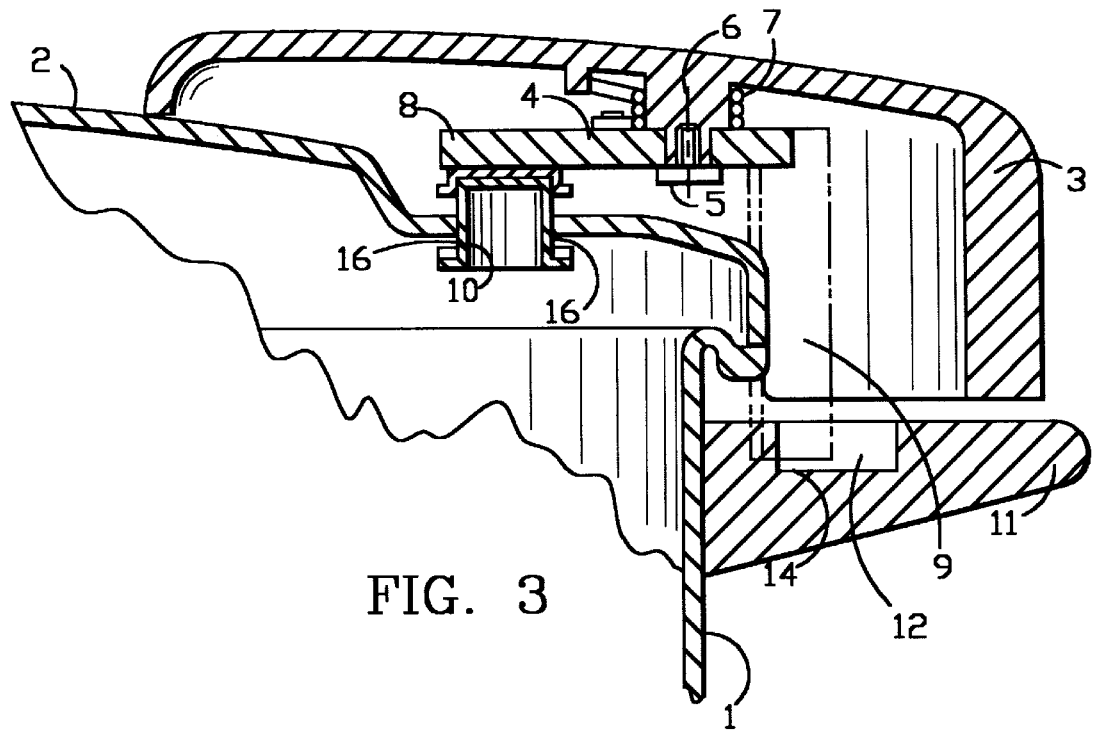
FIG. 3 is a side cross-sectional view of the safety device in a partially closed position.
Figure 4:
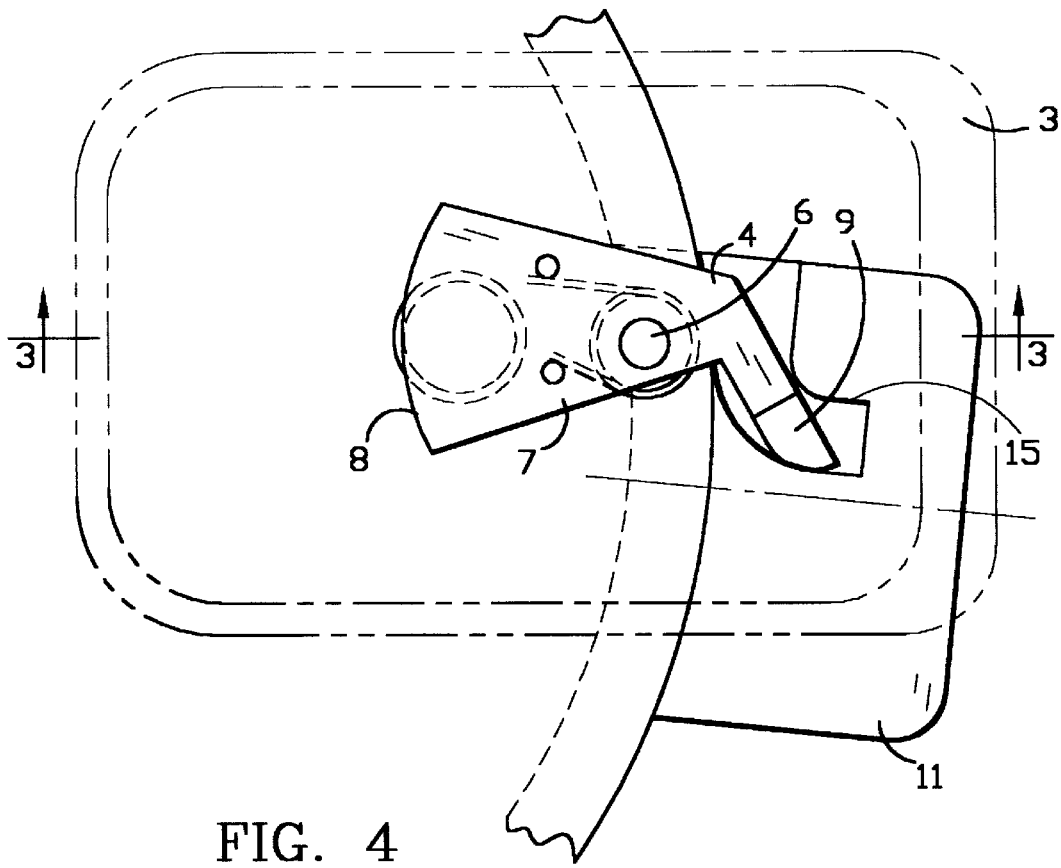
FIG. 4 is a top cross-sectional view of FIG. 3 of the safety device in a partially closed position.
Figure 5:
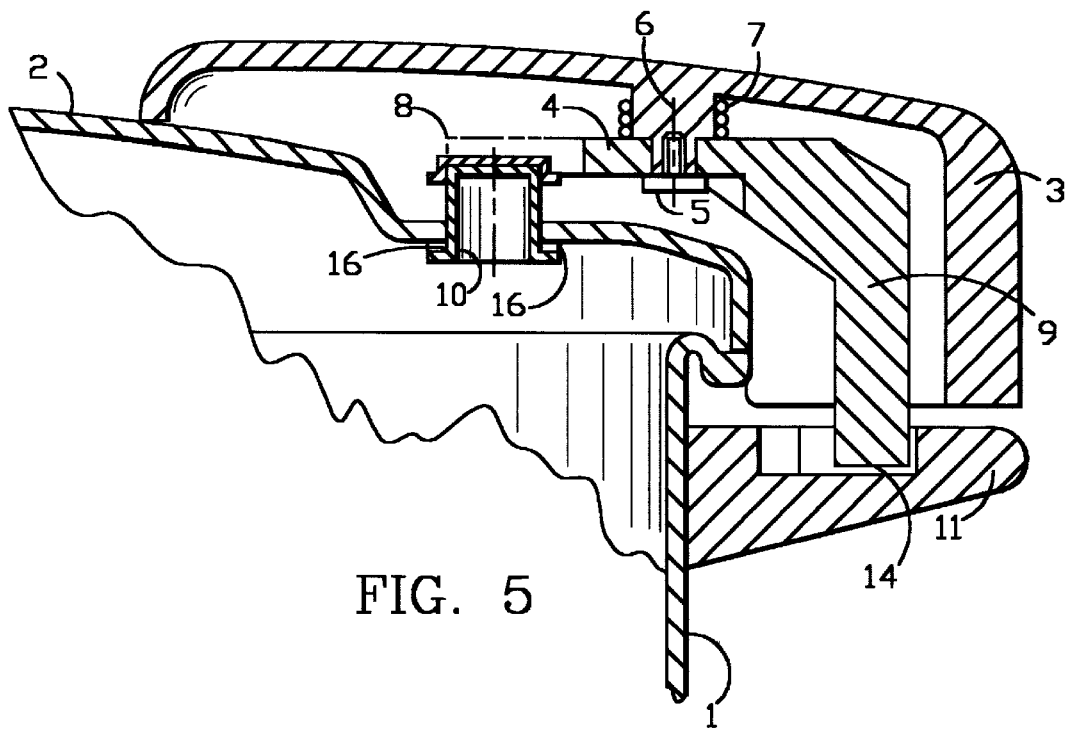
FIG. 5 is a side cross-sectional view of the safety device in the closed position.
Figure 6:
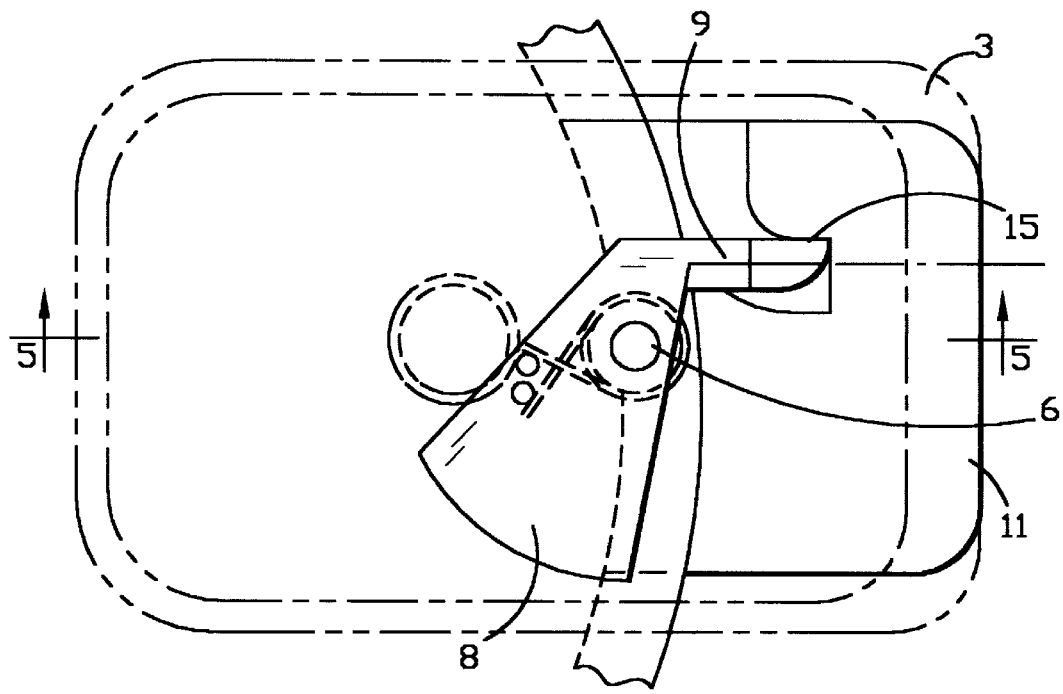
FIG. 6 is a top cross-sectional view of FIG. 5 of the safety device in the closed position.

As mentioned above, this device has two different functions. The first one is to prevent any pressure when the pan is not completely closed. When the pan is turned only slightly (FIG. 3 and FIG. 4) and is not completely closed, the foot (9) of the lever starts to slide around the rounded elbow (13) of the handle and the spring (7) relaxes, allowing the lever (4) to turn on its axis. When steam starts to form inside the pan, the valve (10) goes up immediately and bumps against the wider end (8) opposite the foot of the lever. In this way, the valve (10) is prevented from rising completely to the top, to the closed position, allowing the steam to escape through the escape orifice (16), thus guaranteeing that there is no pressure inside the pan. Only when the pan is completely closed (FIG. 5 and FIG. 6) will the lever (4) allow the valve (10) to move to its upper position, preventing the steam from escaping through the valve (10) and thereby allowing the pressure to increase inside the pan.

The second function is to guarantee safety when the pan is opened. In order to guarantee that the pan is not inadvertently opened by the user when there is still pressure inside, thus running the risk of causing an accident, this device prevents the pan from being opened whenever there is any pressure inside. If there is pressure inside the pan, the valve (10) is closed in its upper position. If the user tries to turn the lid (2) in order to open the pan, the valve (10) will bump against the side of the lever (4), thus preventing it from turning on its axis. When this happens, the lower part (14) of the foot of the lever bumps against the projection (15) of the side handle, thereby preventing the lid (2) from turning on the body (1). Only when the pressure lowers inside the pan will the valve (10) move to the lower position, thus allowing the lever (4) to turn and the pan to be opened completely safely.

There are a few systems, for example the ones described in EP 0 614 63 A1, EP 0 547 668 A1 and WO 85/02851 which corresponds to U.S. Pat. No. 4,620,643, which describe safety mechanisms for opening and closing. As regards the patents EP 0 614 639 A1 and EP 0 547 668 A1, the advantage of the mechanism described in relation to these patents is that as well as guaranteeing safety when opening the pan (as in the case of the abovementioned patents), it also guarantees safety when the pan is closed, which does not happen with the mechanisms described in the other patents. Furthermore, as regards the patent WO 85/03851, in order to close the pan, the mechanism described therein requires the user to press a button as well as turning the lid on top of the body, so that the pan is closed in such a way as to permit the presence of steam inside the pan. It is therefore necessary to carry out two different operations in order to operate the pan. This does not happen with the mechanism described, making it easier for the user to operate the pan.

This mechanism guarantees complete safety for the user of the pressure cooker and it ensures that a single device provides total safety if the pan is not handled properly by the user.

The following figures are attached hereto and make up the opening and closing safety device.

What is claimed is:

1. A safety device for opening and closing a pressure cooker comprising a pressure cooker body and a pressure cooker lid, the pressure cooker body and the pressure cooker lid each having a rim perpendicular to the vertical axis of the body, each rim having a matable bayonet latching system for axially securing the lid to the body by relative rotation of the lid and body, the safety device comprising:

a pressure activated pop-up closing valve disposed axially through an opening in the lid, the valve axially movable from an axially inward open position to an axially outward closed position;

a side handle attached to the cooker body parallel to the body rim, the side handle having an L-shaped channel in the upper surface;

an upper body member mounted on the lid approximate the valve;

a rotatable lever rotatably mounted to the upper body member at a pivot point for rotation generally above and parallel to the lid rim, the lever having a fan-shaped portion extending generally over the valve and the lid, and a foot portion extending opposite the fan and beyond the rim, the foot portion offset at an angle from the extending fan-shaped portion, wherein the lever is rotatable from an initial position, in which the fan portion is in axial alignment with the popup valve and prevents the valve from moving axially outward closed position, to a locking position in which the fan portion is axially clear of the valve and allows the valve to move axially out of the closed position;

a lower portion axially extending from the foot portion and having an end engageable in the L-shaped channel;

wherein rotation of the cooker lid relative to the cooker body causes the end of the axially extending lower portion to slide in the L-shaped channel causing the fan-shaped portion to rotate out of alignment with the valve so that the valve can move axially outward to the closed position.

2. The safety device of claim 1 further comprising a spring biasing the lever to the initial position.

3. The safety device of claim 1 wherein:

the L-shaped channel includes a rounded elbow at the bend in the L and a stopping projection at the base of the L; and the end of the lower portion of the foot includes a rounded inside edge which slides on the rounded elbow of the channel and a straight outside edge that abuts the stopping projection on the L-shaped channel so that when the fan shaped portion of the lever is rotated out of axial alignment with the valve and the valve moves to the closed position, the lever is locked against the valve and the valve blocks the lever from returning to the initial position.

* * * * *